United States Patent [19]

Blazey et al.

[11] 4,126,385
[45] Nov. 21, 1978

[54] ACOUSTOOPTIC MATERIAL

[75] Inventors: Richard N. Blazey; Sarah E. Petrie, both of Rochester, N.Y.

[73] Assignee: Eastman Kodak Company, Rochester, N.Y.

[21] Appl. No.: 752,231

[22] Filed: Dec. 20, 1976

[51] Int. Cl.$^2$ .............................................. G02F 1/33
[52] U.S. Cl. .................................................. 350/358
[58] Field of Search ............... 350/161 W, 358; 264/1

[56] References Cited

U.S. PATENT DOCUMENTS

| 3,749,476 | 7/1973 | Daly et al. | 350/358 |
| 3,938,881 | 2/1976 | Biegelsen | 350/161 W |

OTHER PUBLICATIONS

Hartmann et al., "Ultrasonic Hysteresis Absorption in Polymers", J. App. Phys., vol. 43, No. 11, Nov. 1972, pp. 4304-4311.

*Primary Examiner*—Stanley D. Miller, Jr.
*Assistant Examiner*—James W. Davie
*Attorney, Agent, or Firm*—R. P. Hilst

[57] ABSTRACT

An acoustooptic material comprising a sterically hindered polyphenyl compound is disclosed. The material is typically a chlorinated para-terphenyl compound. The material is characterized in that its sound attenuation is lower than 10 dB/cm at 40 MHz measured at about 25° C. In another aspect, the polyphenyl compound is mixed with other polymers to form useful acoustooptic materials. In yet another aspect, an acoustic transducer may be associated with the polyphenyl material by molding the transducer in the material or softening a portion of the material with a solvent and attaching the transducer to the softened portion.

12 Claims, No Drawings

ACOUSTOOPTIC MATERIAL

FIELD OF THE INVENTION

The present invention relates to acoustooptic devices. More particularly, it relates to the use of sterically hindered polyphenyl compounds as the acoustooptic material in such a device.

DESCRIPTION OF THE PRIOR ART

Over forty years ago Debye and Sears discovered that if sound is launched into certain materials, the materials could defract light incident on the material. These materials became known as acoustooptic materials or light-sound interaction media. Since the discovery of the laser, much effort has been directed towards providing acoustooptic materials for controlling the path of a coherent light beam. Most known materials that have very desirable acoustooptic properties, are also quite expensive to make or to fabricate into a form useful for acoustooptic purposes. Further, due to the physical properties of known materials, attachment of an acoustic transducer, which is usually done to prepare an acoustooptic device, becomes difficult.

Useful acoustooptic materials must meet many criteria. The material must transmit light and sound efficiently, and have a high light-to-sound coupling efficiency. The constant which relates the percent of incident light deflected in an acoustooptic material to the intensity of the deflecting sound wave within that material is known as the acoustooptic figure of merit of the material. The acoustooptic figure of merit $M_2$ is defined by the following expression:

$$M_2 = n^6 p^2 / \rho v^3$$

wherein
- $n$ is the refractive index
- $p$ is the elastooptic coefficient
- $v$ is the sound velocity in the material
- $\rho$ is the density (The units of $M_2$ are $cm^2/erg$, and are usually referred to as "cgs units")

Because of the large number of factors that must be considered in choosing acoustooptic materials, it is very difficult beforehand to know whether a specific material will be useful. Materials that have been found to be useful in the past have generally been limited to single crystals and glasses. Under certain limited conditions some polymers have also been found to be useful materials. "Guidelines For The Selection Of Acoustooptic Materials", IEEE J. of Quantum Electronics, Vol. QE-6, No. 4, April 1970, pages 223-238, provides a broadly defined description of the selection criteria.

Many organic polymers have some properties that are desirable in acoustooptic materials. Polymers are generally easy to make, are machineable and therefore quite inexpensive to fabricate into acoustooptic devices. Further, many polymers have acoustooptic figures of merit that are higher than most glasses and single crystals. All polymers that have been tested in the past, however, have very high sound attenuation. This characteristic sound attenuation all but eliminates the advantages these polymers have over single crystal and glass materials.

In commonly assigned application Ser. No. 768,452, filed Feb. 14, 1977, which is a continuation-in-part of application Ser. No. 557,196, filed Mar. 10, 1975, abandoned. "Plastic Acoustooptic Device", Blazey describes the use of a plastic acoustooptic material, preferably polystyrene, in an acoustooptic cell. The lowest acoustic attenuation for any of the polystyrene materials disclosed in that application is 13dB/cm at 40 MHz. Although such a material is useful as an acoustooptic deflector, acoustic attenuation imposes several design restraints on acoustooptic devices made from this material. In order to avoid the problem of high acoustic attenuation, the preferred embodiments described in that application direct a very small-diameter laser beam through an acoustooptic block very close to the transducer. Additionally, means for dissipating the heat generated by the high acoustic attenuation of the material is provided.

U.S. Pat. Nos. 3,174,044 to Tien and 3,495,894 to Lenzo et al. describe conventional acoustooptic materials such as lithium metaniobate, lithium tantalate and alpha-iodic acid. These materials exhibit excellent acoustooptic properties, but, in comparison to polymeric materials, are extremely expensive. For example, a typical inorganic-single-crystal acoustooptic cell might cost as much as $2,500 to fabricate.

To make an acoustooptic device, one or more piezoelectric transducers must be bonded to the acoustooptic medium. The quality of this bond is important to the performance of the device and as a result, highly complex methods have been developed to bond the transducer to the medium. (See for example, U.S. Pat. No. 3,453,166 to Herriott et al.) If low acoustic impedance organic cements are used, the bond must be exceedingly thin. If high impedance materials such as indium, silver or gold are used the bonding layer can be thicker but the bonding must be carried out in a vacuum thereby requiring expensive complex equipment.

There is thus a need for a high efficiency, low-cost acoustooptic material. It would be highly desirable if the material could be easily and cheaply attached to the transducer.

SUMMARY OF THE INVENTION

The present invention provides an acoustooptic device wherein the acoustooptic material includes a sterically hindered polyphenyl compound having a sound attenuation less than about 10 dB/cm at 40 MHz measured at 25° C. In another aspect of the present invention, there is provided an acoustooptic medium which is a mixture of the sterically hindered polyphenyl compound and another moldable, polymeric, acoustooptic material. In still another aspect of the present invention, there is provided an acoustooptic material which, along with an acoustic transducer forms an integral acoustooptic cell.

DETAILED DESCRIPTION OF THE INVENTION

We have found that rod-like materials, such as sterically hindered polyphenyl compounds, have the necessary combination of properties to be useful as acoustooptic materials. By sterically hindered we mean that the phenyl groups of the polyphenyl compound are inhibited from rotation around their interconnecting bonds by rotation-inhibiting substituent groups. The polyphenyl compounds of the present invention typically have the phenyl groups attached to each other by bonds in the para position. Steric hinderance to rotation is provided by having at least one rotation-hindering substituent group pendent between substantially all of the phenyl-group pairs in the compound. By "pendent between" it is meant that the rotation-inhibiting substituent, because of its position in the structure, occupies the space between one of the phenyl groups of a pair and the other. Exemplary structures are illustrated by the following non-limiting examples.

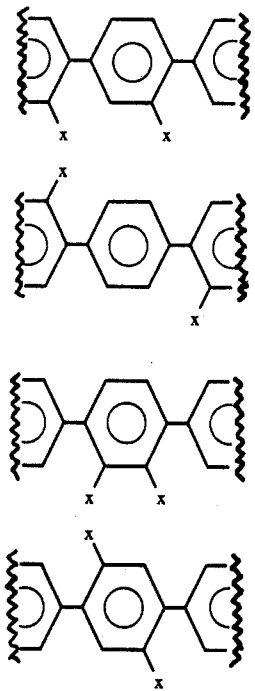

where $x$ is a rotation-inhibiting substituent group.

The rotation-inhibiting substituent group may be any of a wide variety of such groups well known in the art. The groups is considered useful if it inhibits motion of the molecule so that the material has a sound attenuation lower than about 10 dB/cm at 40 MHz measured at 25° C. Preferably the group is chosen so as to maximize the refractive index. Suitable rotation-inhibiting substituent groups include chlorine, bromine, iodine, lower alkyl and lower alkoxy having, for example, 1 to about 6 carbon atoms. Polyphenyl compounds substituted with chlorine, bromine or iodine are preferred in that these compounds have a high refractive index which contributes to a high acoustooptic figure of merit.

In the polyphenyl compounds described above, the properties which are important for acoustooptic performance are not adversely affected by increasing chain length. Therefore, any polyphenyl compound having at least three phenyl groups which has substantially all of the phenyl groups blocked from rotation as described above is useful in the practice of the present invention. Increasing chain length can increase the glass transition temperature of the oligimer which can have positive effect on the overall suitability of the material for use in acoustooptic devices. As a material approaches its glass transition temperature its sound attenuation increases drastically. A higher glass transition temperature therefore allows the material to be used at higher temperatures.

A useful class of polyphenyl compounds are readily available chlorinated para-terphenyl compounds. The preparation of these compounds is disclosed in "The Chemistry of Resins", Carleton Ellis, Vol. II, pages 1142 to 1151, Reinhold, 1935. By choosing such a compound which is substituted in at least 9 of the 14 available substituent positions, it is assured that all of the phenyl groups are inhibited from rotation by at least one chlorine atom pendent between the phenyl-group pairs. It will be appreciated however, that a para-terphenyl compound may be useful herein with as few as two rotation-inhibiting substituent groups. These materials have high acoustooptic figures of merit (about $200 \times 10^{-18}$ cgs units) along with low sound attenuation (about 1.5 dB/cm at 40 MHz). These materials are oligimers having glass transition temperatures of between about 50 and 80° C. They may be molded, are self-supporting and machineable. They may be polished so as to provide the necessary optical surfaces which are required in many acoustooptic applications.

Depending on the particular structure, the acoustooptic materials of the present invention have useful acoustooptic properties over a frequency range of about 1 MHz to about 150 MHz. The term acoustic as used herein is therefore not limited to the range that is audible to humans but includes sonic, supersonic and ultrasonic ranges. As is well known in the art, the acoustic range is limited by the requirement that the acoustic wave in the acoustooptic material be greater than or equal to one half the optical wavelength in the material.

The term optic as used herein encompasses all electromagnetic energy to which the materials of the present invention are substantially transparent. Typically, these materials have a transmission range of at least about 480 m$\mu$ to about 1600 m$\mu$.

The lack of viscous relaxations which contribute to the low sound attenuation of the polyphenyl compounds of the present invention also make these compounds very brittle. As a result, the polyphenyl compounds must be molded with care so as to prevent the differential cooling which results in the cracking of the material. The materials of the present invention may be conventionally molded or molded simply by pouring melted material into a suitable mold. During the molding process, annealing at a temperature slightly below the glass transition temperature is desirable so as to reduce the stresses set up by any differential cooling which may occur. Additionally, silicone rubber molds may be used so that the material being molded closely follows the oven temperature during the annealing process. The material which results from the molding process may be polished if necessary to provide optical surfaces. One suitable polishing composition is alumina on flannel.

An acoustic transducer may be attached to the acoustooptic materials of the present invention by any of a number of methods. A particularly advantageous method is to mold the transducer directly into the acoustooptic material. Another method is to soften a portion of the material with a suitable solvent and attach the transducer directly to the softened portion. Either the molding or solvent-bond method described above provides an acoustooptic cell where the transducer and acoustooptic material form an integral unit. In a third method for bonding the transducer to the interaction medium, an organic adhesive is used such as described in U.S. Pat. No. 3,453,166. Suitable organic adhesives include "HE-80" which is a trade name for a commercially available optic cement made by Eastman Kodak Company and "Lens Bond M-62"$^{TM}$ which is a polyester adhesive commercially available from Sommers Lab Inc.

In another aspect of the present invention, it has been found that the sterically hindered polyphenyl compounds may be blended with other polymers to form useful acoustooptic materials. Preferably the resulting blend has an acoustooptic figure of merit between about $30 \times 10^{-18}$ and about $10,000 \times 10^{-18}$ cgs units. Thus, useful materials may be formed by blending a polyphenyl compound of the present invention with polystyrene. The resulting blend is easier to mold than is the polyphenyl alone.

The following examples are intended to illustrate but not limit the invention

EXAMPLE 1

Aroclor 5460 (a chlorinated para-terphenyl compound which is about 60% by weight chlorine and is made by the Monsanto Company) was molded into a one inch cube. Its acoustooptic figure of merit was measured using the method of Korpel described in IEEE Journal of Quantum Electronics, Sept. 1965, pp. 283-284. The figure of merit was measured to be $214 \times 10^{-18}$ cgs units for a material having a glass transition temperature (Tg) of 58° C.

The sound attenuation was measured using the apparatus described by Korpel. The cell containing the material to be tested is translated away from the transducer. The deflected light intensity is monitored and plotted versus the position of the cell. At low power levels, the deflected light is linearly related to the acoustic intensity at the position of the laser beam in the material. The slope of the plot is therefore the attenuation coefficient. The attenuation for Aroclor 5460 was measured to be 1.9 dB/cm.

EXAMPLE 2

Example 1 was repeated using other polyphenyl Aroclor compounds with the following results:
Aroclor 5465 (65% by weight Cl) Tg = 85° C.
  Figure of merit: $134 \times 10^{-18}$ cgs units
  Sound attenuation: 1.3 dB/cm
Aroclor 5460 (60% Cl) Tg = 62° C.
  Figure of merit: $185 \times 10^{-18}$ cgs units
  Sound attenuation: 1.5 dB/cm
Aroclor 5460 (60% Cl) Tg = 71° C.
  Figure of merit: $173 \times 10^{-18}$ cgs units
  Sound attenuation: no data
Aroclor 5460 (60% Cl) Tg = 79° C.
  Figure of merit: $73 \times 10^{-18}$ cgs units
  Sound attenuation: no data

EXAMPLE 3

A laser-beam deflector was fashioned from a quartz transducer cemented to a ½ by ½ by 1 inch block of Aroclor 5460 (Tg = 58° C.) with an organic adhesive. The device deflected a maximum of 40% of the light (6328Å) incident on the square face of the block for an acoustic input of 1 watt having a 40-MHz center frequency. The acoustooptic bandwidth of the device was greater than 13 MHz.

EXAMPLE 4

Example 3 was repeated except that the transducer was affixed to the Aroclor by first softening the Aroclor with acetone and then applying the transducer to the softened area. The device deflected a maximum of 15% of the incident light.

EXAMPLE 5

A one-inch cube was molded out of Aroclor 5460 (Tg = 58° C.) and polystyrene (50:50 by weight). The acoustooptic figure of merit as measured using the method of Korpel was $120 \times 10^{-18}$ cgs units. Its sound attenuation at 40 MHz, measured using Korpel's water-cell approach, was 5.3 dB/cm.

Acoustooptic devices are well known and may take many forms known to those skilled in the art. The present invention relates specifically to a particular acoustooptic material and is not intended to be limited to any particular acoustooptic device. The invention as described herein contemplates any acoustooptic use of sterically hindered polyphenyl compounds. The compounds of the present invention are useful for example in modulators, deflectors, wave guides, intergrated optic surfaces and the like. Therefore, although the invention has been described in detail with reference to certain embodiments, it will be understood that variations and modifications can be effected without departing from its spirit and scope.

What is claimed is:

1. In an acoustooptic device having means for generating an acoustic wave and attached thereto an accoustooptic material for controlling a light beam, the improvement wherein said material comprises a polyphenyl compound having a sound attenuation less than about 10 dB/cm at 40 MHz said attenuation being measured at 25° C.

2. The improvement according to claim 1 wherein said polyphenyl compound is a substituted para-polyphenyl compound.

3. The improvement according to claim 2 wherein said substituent group is selected from the group consisting of chlorine, bromine, iodine, lower alkyl and lower alkoxy.

4. The improvement according to claim 2 wherein said substituent group is chlorine.

5. The improvement according to claim 1 wherein said polyphenyl compound is a para-terphenyl compound.

6. The improvement according to claim 2 wherein said polyphenyl compound is a para-terphenyl compound and wherein said substituent group is chlorine.

7. The improvement according to claim 1 wherein said acoustooptic material is a blend of a polyphenyl compound and a moldable polymer said blend having an acoustooptic figure of merit between about $30 \times 10^{31\ 18}$ and about $10,000 \times 10^{-18}$ cgs units.

8. The improvement according to claim 7 wherein said polymer is polystyrene.

9. The improvement according to claim 1 wherein said polyphenyl compound has an acoustooptic figure of merit greater than about $100 \times 10^{-18}$ cgs units.

10. The device according to claim 1 wherein said means for generating an acoustic wave is an acoustic transducer.

11. The device according to claim 10 wherein said transducer and said acoustooptic material form an integral unit.

12. The device according to claim 10 wherein said transducer is molded into said acoustooptic material.

* * * * *